March 12, 1946.  W. F. ROSS  2,396,289
FORM TOOL
Filed Aug. 2, 1944   2 Sheets-Sheet 1

INVENTOR.
Walter F. Ross.
BY
Stanley Lightfoot
ATTY.

March 12, 1946.    W. F. ROSS    2,396,289
FORM TOOL
Filed Aug. 2, 1944    2 Sheets-Sheet 2

INVENTOR.
Walter F. Ross.
BY
Stanley Lightfoot
ATTY.

Patented Mar. 12, 1946

2,396,289

UNITED STATES PATENT OFFICE 2,396,289

FORM TOOL

Walter F. Ross, Detroit, Mich., assignor to Motor Tool Manufacturing Company, Detroit, Mich., a corporation of Michigan Application August 2, 1944, Serial No. 547,731

7 Claims. (Cl. 29—105)

This invention relates primarily to rotary form cutting tools although it is not necessarily limited to tools usually so designated in the trade as it is also applicable to various rotary cutting tools such, for instance, as hobs or slab mills.

It is also primarily applicable to such rotary cutting tools having inserted or individually mounted cutting teeth, but here again it is not necessarily so limited, as in the case of hobs previously mentioned the teeth may be an integral part of the tool.

More particularly the invention resides in the novel positioning of the teeth of the tool with respect to the longitudinal axis thereof and also resides in the relative positioning of different cutting teeth in the tool with respect to such longitudinal axis and with respect to one another where such relative positioning is desirable.

Still further the said invention has for an object to provide a tool of the type referred to wherein the teeth are set at a substantially constant angle with respect to the longitudinal axis of the tool but wherein the average rake angle of the teeth is varied to meet differing conditions under which different teeth are to operate, where such differing conditions are involved.

More particularly the said invention aims to provide, in a tool of the type referred to, a varied rake in each of a series of individual teeth of the tool whereby the relation of this rake between separate teeth of the tool may be varied to meet varying conditions of operation as affecting the different teeth, such as might result from varying diameters in the length of the tool.

A further object is to provide, in a tool of the type referred to, a tooth arrangement presenting a minimum of tooth cutting edge to the work per revolution of cutter and calculated to introduce a minimum of torque per increment of feed.

A still further object is to provide, in a tool of the type referred to where chip thickness is variable for different teeth in the tool, a progressive rate of change of rake angle per tooth and a variation of the initial rake angle of each tooth to meet any variation of chip thickness with which each tooth is to contend.

A still further and important object of the said invention is to provide a tool of the type referred to wherein a substantially constant shear angle per tooth is included, which provides for a more uniform cutting pressure along the cutting length of tool. By contrast, a cutter of like profile, prepared in conventional manner, will have a changing angle of helix due to effect of changing diameters or juggling of leads. These changing angles incur changes in cutting pressure components.

Still further said invention contemplates in a multiple toothed cutting tool the provision of substantially semi-circular cutting elements or teeth with their arcuate portions recessed into correspondingly arcuate keyways in the body of the tool and suitably welded or otherwise secured therein; and further contemplates the provision in the body of the tool of recesses immediately in advance of the said cutting elements and communicating with flutes formed in the body of the tool.

The invention still further contemplates that the flutes be at a material angle to the faces of the cutting elements whereby the leading edges of the said cutting elements approach the flutes and as a consequence are set at a maximum distance in advance of the flute which is situated to the rear of a series of cutting elements.

Still further objects or advantages additional or subsidiary to the aforesaid objects, or resulting from the construction or operation of the invention as it may be carried into effect, will become apparent as the said invention is hereinafter disclosed.

In carrying the said invention into effect, I may adopt the novel construction and arrangement of parts hereinafter described, by way of example, having reference to the accompanying drawings, wherein.

Figure 1:
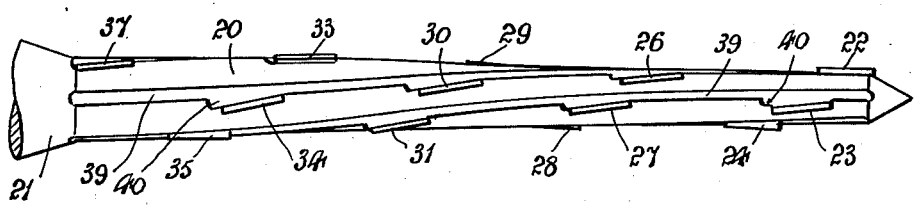
Figure 1 is an elevation of a form tool embodying the said invention.
Figure 2:
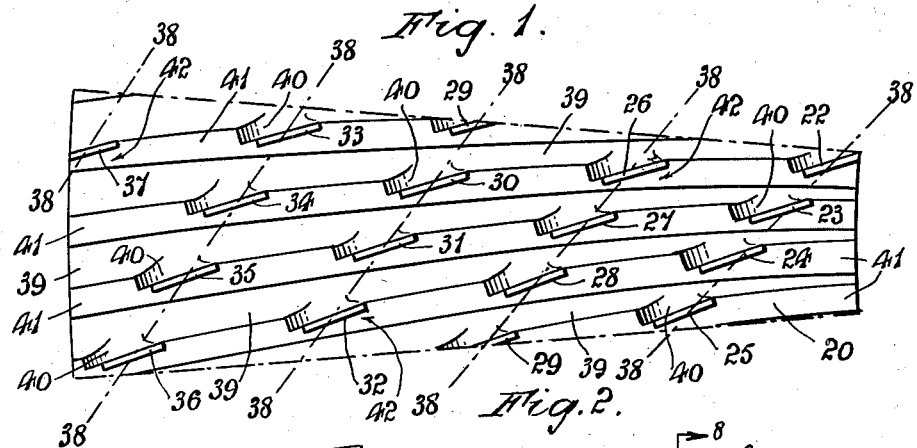
Figure 2 is a schematic development of the surface of the said form tool.

Similar characters of reference indicate similar parts in the several figures of the drawings. Figures 1 and 2 are drawn to a smaller scale than are the remaining figures of the drawings.

The example illustrated is characterized by body 20 of the form tool increasing in diameter from the point to the shank end 21, the variation in this case being more or less regular although it may be quite irregular according to the form of cut which the tool is intended to make, as will be readily understood. As a matter of fact, within the purview of this invention the tool may be merely conical in form, or even without any taper, in which latter cases it might not correctly be referred to as a form tool, but under certain circumstances of usage the teeth may be subjected to varying loading and the present invention therefore applicable with benefit, as will be hereinafter further explained.

The tool used as an example herein is shown as a left hand form tool provided with inserted cutting teeth or tips numbered in the order of their progress from the smaller to the larger end of the tool 22, 23, 24, 25, 26, 27, 28, 29, 30, 31, 32, 33, 34, 35, 36 and 37. Each of these teeth or tips is set at an angle to the longitudinal axis of the tool which angle may be substantially constant throughout the series of tips and the said series of tips are arranged in helical form, as indicated by the dotted lines 38, around the body of the tool as clearly indicated in Figure 2. The length of the cutting edge of each tooth or tip is such that the trailing edge of each tip will overlap the leading edge of the next succeeding tooth or tip in its cutting relation thereto.

Where the tool is of varying diameter in its length, as is the specific example illustrated, it is believed that the setting of the cutting teeth or tips at a constant angle to the longitudinal axis of the tool is unique; as commonly the method of manufacturing form tools does not admit of the maintenance of such constant angle regardless of peculiar changes in the diameter of the cutter body. Applicant's preferred method of accomplishing this, wherein he uses a keyseat cutter set at the desired angle to the longitudinal axis of the tool body blank moving the said body a certain amount to provide a keyseat for each indicated tooth and indexing a certain definite number of degrees with each such movement, and thereafter effecting the keyseating operation to a constant depth from the surface after the tool body has been moved laterally a pre-determined amount in each case to vary the rate as and for the purposes hereinafter more particularly explained, is the subject of my co-pending application, Serial No. 549,093, filed August 11, 1944.

39 are the grooves or flutes formed in the body of the tool and passing through successive turns of the helix defined by the lines 38, herein before referred to, these flutes passing in front of teeth such as 23, 27, 31 and 35, for instance, but at an acute angle to the face of the said teeth.

A recess 40 is formed in the wall of each flute immediately in advance of each tooth to provide chip clearance, and in the preferred form these recesses increase in depth from the flute as they progress from the leading edge to the trailing edge of each tooth. As a consequence the leading edge of each tooth, which takes the initial shock of the bite into the work being machined, is backed up by a maximum amount of the land 41 of the tool body, as at 42, and the force resulting from the cutting operation is directed to a large extent along the length of the tooth and at an acute angle to the length of the land carrying the tooth and therefore is substantially in the direction of the length of the said land. The distribution of these forces permits of a considerable number of teeth to be used on a body of a given size with adequate support, both as to strength and rigidity.

Figures 4, 5:
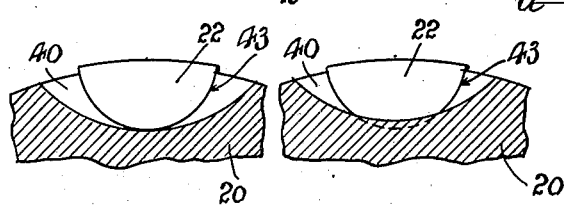
Figure 4 is a detail section taken on a plane indicated by the line 4—4 in Figure 3, and showing a preferred method of mounting of the cutting tooth.
Figure 5 is a similar section to Figure 4 showing a somewhat modified arrangement of the same.

I prefer to make both the tooth or bit arcuate so far as its inserted portion is concerned, setting it in a correspondingly arcuate recess 43 in the land of the tool, and also to make the clearance recess 40 in the wall of the flute similarly arcuate although of greater radius as shown in Figures 4 and 5; Figure 5 illustrating that the said clearance recess may be shallower than the tooth recess 43 whereby the bottom of the tooth may extend below the bottom of the said clearance recess 40 and be thereby additionally locked against any possible tendency to be forced laterally out of position. The said teeth are, however, firmly secured in position by welding, cementing or in any other manner which may be considered expedient.

Figures 3, 7:
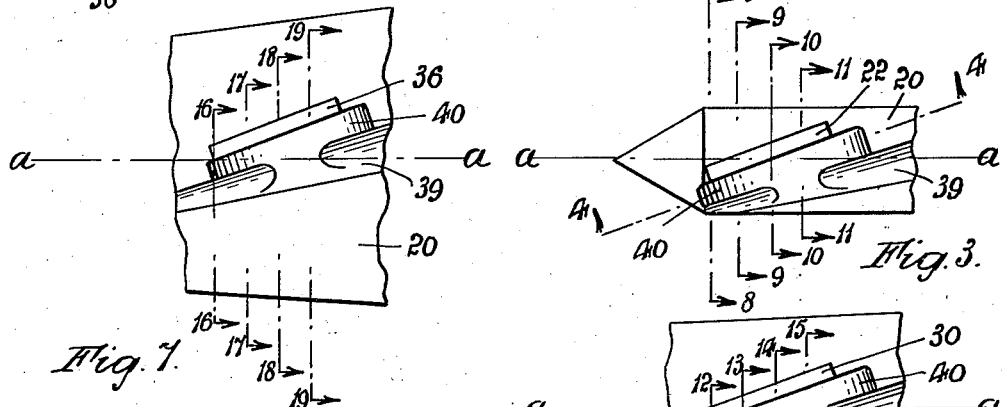
Figure 3 is a detail plan of the small end of the said form tool showing the relation of the cutting tooth to the longitudinal axis of the tool.
Figure 7 is a similar view to Figure 6 of a portion of the said form tool at a point of still greater diameter.
Figure 6:
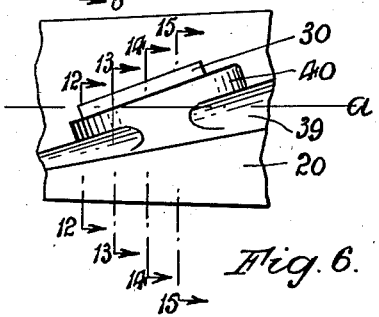
Figure 6 is a plan similar to Figure 3 of an intermediate portion of the form tool.

An important feature of the invention is illustrated in detailed comparison in Figures 3, 6 and 7 of the drawings, and further exemplified by the diagrams Figures 8 to 19 inclusive.

The longitudinal axis of the tool is indicated at $a$ in each of the said figures and $b$ indicates a radial plane perpendicular to said axis $a$. As before noted, the diameter of the tool varies from the front to the rear end thereof, not necessarily in any regular increase, and I propose to offset the various teeth to different degrees relative to the plane $b$ to meet differing cutting efforts which individual teeth are to meet as a result of such changes in diameter of the tool.

Figure 8:
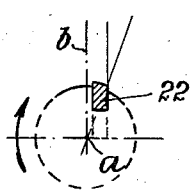
Figures 8, 9, 10 and 11 are schematic sections taken on correspondingly numbered planes indicated in Figure 3.
Figure 9:
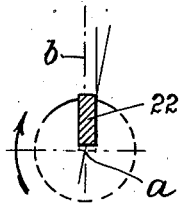
Figure 10:
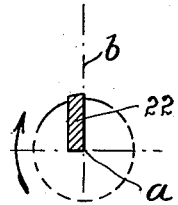
Figure 11:
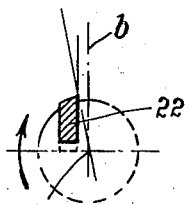

An arrangement which has proved highly satisfactory in actual practice in a tool having the approximate proportions of that illustrated calls for the tooth 22 at the smaller end of the tool to be so situated that its medial portion crosses the plane $b$ immediately above the longitudinal axis $a$ so that this tooth 22 has zero rake at that point as clearly shown in Figure 10. Thus the leading edge of the tooth 22 has a pronounced negative rake as shown in Figure 8, and a light negative rake at a point between this and the center of the tooth as shown in Figure 9, the trailing end of the tooth beyond the center thereof having a light positive rake as shown in Figure 11. The arrows indicate direction of rotation of the tool in performing its work cutting operation.

Figure 12:
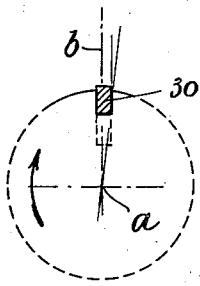
Figures 12, 13, 14 and 15 are similar sections taken on correspondingly numbered planes in Figure 6.
Figure 13:
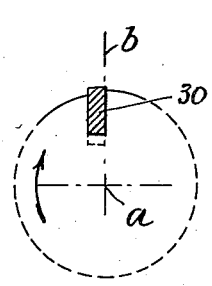
Figure 14:
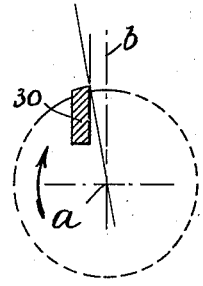
Figure 15:
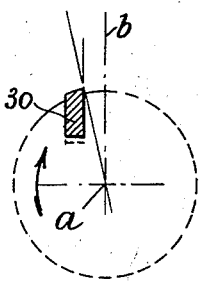

Now, referring to Figure 6, it will be seen that this shows an intermediate portion of the tool of larger diameter and that the tooth 30 differs in position relative to the longitudinal axis $a$ of the tool in that it has been offset somewhat to the rear so that the medial portion of such tooth 30 is now behind the plane $b$ giving a light positive rake to the tooth at this medial point, as shown in Figure 14, a point forward thereof crossing the said plane with zero rake as shown in Figure 13, and the leading edge being in advance of the said plane resulting in light negative rake as shown in Figure 12. Consequently the trailing edge of the said tooth 30 is offset to a greater extent from the plane $b$ than is the trailing edge of the tooth 22, previously described, and has a pronounced positive rake.

Figure 16:
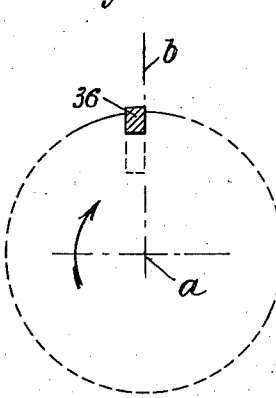
Figures 16, 17, 18 and 19 are similar sections taken on correspondingly numbered planes indicated in Figure 7.
Figure 17:
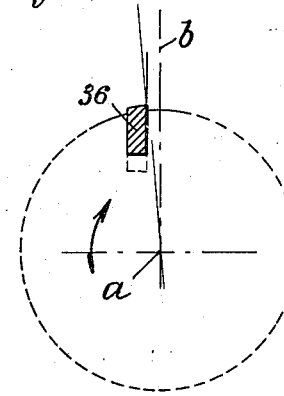
Figure 18:
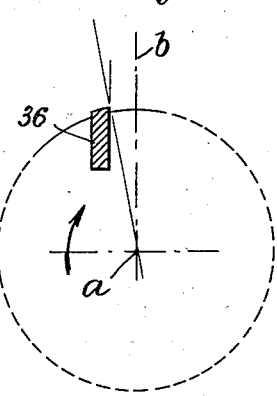
Figure 19:
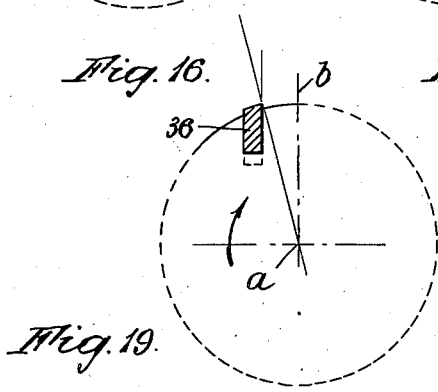

The offset from the perpendicular plane through the longitudinal axis is still further accentuated in the case of the tooth 36 situated on the larger end of the tool, so that here the leading edge of the said tooth 36 touches the plane b with zero rake, as shown in Figure 16, the rake progressively increasing through light positive, and pronounced position to heavy positive at the trailing edge of the tooth 36 as clearly shown in Figures 17, 18 and 19 respectively.

Thus, in the present case where the diameter of the tool constantly changes from one end of the tool to the other, I not only provide for a constantly changing rake in each tooth resulting from the fact that every point in the length of the tooth has a different offset from a perpendicular plane passing through the longitudinal axis of the tool, but I also vary the type, extent and relationship of this rake as between different teeth in the tool. Furthermore, I am able to definitely relate this latter variation of rake between different teeth to meet differing cutting conditions which may be imposed on the different teeth, such, for example, as results from change in diameter of the cutter at one or another point in its length.

While the tooth arrangement has been described as applied to a form tool cutter of somewhat irregularly varying diameter throughout its length, it may be applied with advantage to regularly tapered cutters, or even to cutters wherein the diameter does not vary but where the nature of the work imposes conditions differing with respect to some of the cutter teeth as compared with others.

Still further, I wish it to be understood that while the invention lends itself excellently to inserted tooth design, it nevertheless is applicable to tooth structures formed integrally in the body of the tool as in the case of hobs, for instance, where the cutting faces of the teeth may be provided with the angular and offset modifications described with relation to the horizontal axis of the hob.

Throughout all this I prefer to maintain a constant angle between the face of the several teeth and the longitudinal axis of the tool irrespective of any changes in diameter.

A form tool embodying the features described wherein the teeth are characterized by their variable rate in which every point on the tooth has a different offset due to the unique positioning of the said teeth, is free of the grabbing tendencies, especially in form tools of considerably varying diameter. The arrangement described permits of increased rake angle as the chip thickness grows.

The described arrangement also permits of the presentation of a minimum of tooth cutting edge to the work, per revolution of cutter, thereby insuring a minimum of torque per increment of feed. The objectionable shuddering commonly occurring in cutters such as of the contour illustrated herein having a rapidly changing helix angle is minimized as a result of the fact that the improved arrangement is characterized by the maintenance of a substantially constant shear angle per tooth.

As a result of the many favorable features of the described tooth arrangement a very high degree of efficiency, cutting speed and life in the tool may be obtained with resulting production economy in work accomplished by such a tool.

This invention may be developed within the scope of the following claims without departing from the essential features of the said invention, and it is desired that the specification and drawings be read as being merely illustrative of a practical embodiment of the said invention and not in a strictly limiting sense.

What I claim is:

1. A varied diameter multiple toothed cutting tool of the type described comprising, an elongated tapering body having substantially circular cross-sections of varying diameters, a plurality of teeth disposed in spaced relation along said body, each of said teeth having an outwardly exposed substantially straight cutting edge, and said teeth being so disposed as to have partly negative and partly positive rake with the relative ratio of negative and positive rake varying in favor of positive rake with increasing diameter of the tool.

2. A multiple toothed cutting tool of the type described comprising, an elongated body having substantially circular cross-sections, a plurality of teeth carried by said body and spaced therealong, each of said teeth presenting a substantially straight outwardly exposed cutting edge, and said teeth being so disposed as to have partly negative and partly positive rake with the ratio of negative to positive rake varying in favor of positive rake as the teeth progress from one end of the tool to the other.

3. A generally tapered multiple toothed cutting tool of the type described comprising, an elongated tapering body having substantially circular cross-sections of varying diameters, a plurality of teeth secured in spaced relation in and along said body, each of said teeth having an outwardly exposed substantially straight cutting edge, and said teeth being so disposed as to have partly negative and partly positive rake with the ratio of negative and positive rake varying in favor of positive rake as the teeth progress from the smaller to the larger end of the tool.

4. A multiple toothed cutting tool of the type described comprising, an elongated body having substantially circular cross-sections, a plurality of teeth carried by said body and spaced therealong, each of said teeth presenting a substantially straight outwardly exposed cutting edge, and said teeth being so disposed as to have partly negative and partly positive rake with the relative ratio of negative and positive rake varying in different teeth of the tool, all of said teeth being set at a substantially constant angle to the longitudinal axis of said tool.

5. A varied diameter multiple toothed cutting tool of the type described comprising, an elongated tapering body having substantially circular cross-sections of varying diameters, a plurality of teeth secured in spaced relation in and along said body, each of said teeth having an outwardly exposed substantially straight cutting edge, and said teeth being so disposed as to have partly negative and partly positive rake with the relative ratio of negative and positive rake varying in favor of positive rake with increasing diameter of the tool, all of said teeth being set at a substantially constant angle to the longitudinal axis of said tool.

6. A generally tapered multiple toothed cutting tool of the type described comprising, an elongated body having substantially circular cross-sections, a plurality of teeth carried by said body and spaced axially therealong, each of said teeth presenting a substantially straight outwardly exposed cutting edge, and said teeth being so mounted as to have partly negative and partly positive rake with the ratio of negative and positive rake varying in favor of positive rake as the teeth progress from the smaller to the larger end of the tool, all of said teeth being set at a substantially constant angle to the longitudinal axis of said tool.

7. A multiple toothed cutting tool of the type described comprising, an elongated tapering body having substantially circular cross-sections of varying diameters, a plurality of teeth secured in spaced relation in and along said body, each of said teeth having an outwardly exposed substantially straight cutting edge, and said teeth being so mounted as to have partly negative and partly positive rake with the ratio of negative to positive rake varying in favor of positive rake as the teeth progress from one end of the tool to the other, all of said teeth being set at a substantially constant angle to the longitudinal axis of said tool.

WALTER F. ROSS.